(12) United States Patent
Kumazawa et al.

(10) Patent No.: US 12,235,482 B2
(45) Date of Patent: Feb. 25, 2025

(54) OPTICAL FILM, RETARDER FILM, AND METHOD FOR MANUFACTURING SAME

(71) Applicant: ZEON CORPORATION, Tokyo (JP)

(72) Inventors: Kazuki Kumazawa, Tokyo (JP); Hironari Sudeji, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 935 days.

(21) Appl. No.: 17/294,462

(22) PCT Filed: Nov. 8, 2019

(86) PCT No.: PCT/JP2019/043993
§ 371 (c)(1),
(2) Date: May 17, 2021

(87) PCT Pub. No.: WO2020/110672
PCT Pub. Date: Jun. 4, 2020

(65) Prior Publication Data
US 2022/0011490 A1    Jan. 13, 2022

(30) Foreign Application Priority Data

Nov. 30, 2018   (JP) .................................. 2018-225554

(51) Int. Cl.
| | | |
|---|---|---|
| G02B 5/30 | (2006.01) | |
| B29C 48/00 | (2019.01) | |
| B29C 48/08 | (2019.01) | |
| B29C 71/02 | (2006.01) | |
| C08L 53/02 | (2006.01) | |
| B29K 96/04 | (2006.01) | |

(52) U.S. Cl.
CPC ........ *G02B 5/3083* (2013.01); *B29C 48/0018* (2019.02); *B29C 48/08* (2019.02); *B29C 71/02* (2013.01); *C08L 53/025* (2013.01); *B29K 2096/04* (2013.01); *B29K 2995/0034* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 2004/0077795 A1* | 4/2004 | Hashizume | ............... C08F 8/04 525/338 |
| 2010/0283949 A1 | 11/2010 | Uchiyama et al. | |

FOREIGN PATENT DOCUMENTS

| | | | |
|---|---|---|---|
| JP | H05164920 | A | 6/1993 |
| JP | 2001350023 | A * | 12/2001 |
| JP | 2006111650 | A | 4/2006 |
| JP | 2006142561 | A | 6/2006 |
| JP | 2006143799 | A | 6/2006 |
| JP | 2007226109 | A | 9/2007 |
| JP | 2018017967 | A * | 2/2018 |
| WO | 2008146924 | A1 | 12/2008 |

OTHER PUBLICATIONS

May 25, 2021, International Preliminary Report on Patentability issued in the International Patent Application No. PCT/JP2019/043993.
Jan. 28, 2020, International Search Report issued in the International Patent Application No. PCT/JP2019/043993.

* cited by examiner

*Primary Examiner* — Eli D. Strah
(74) *Attorney, Agent, or Firm* — KENJA IP LAW PC

(57) ABSTRACT

An optical film formed of a resin C including a copolymer P containing a polymerization unit A and a polymerization unit B, wherein the optical film includes a phase separation structure that expresses structural birefringence, the phase separation structure includes a phase (A) containing as a main component the polymerization unit A and a phase (B) containing as a main component the polymerization unit B, and |n(A)−n(B)| is 0.12 or more.

20 Claims, No Drawings

OPTICAL FILM, RETARDER FILM, AND METHOD FOR MANUFACTURING SAME

FIELD

The present invention relates to an optical film, a phase difference film, and a method for producing the optical film and the phase difference film.

BACKGROUND

In display devices such as liquid crystal display devices, optical films having various properties may be disposed for improving the display quality. Various optical films are under development. For example, optical films with optical anisotropy (Patent Literatures 1 and 3 to 5) and optical films with optical isotropy (Patent Literature 2) are developed.

CITATION LIST

Patent Literature

Patent Literature 1: Japanese Patent Application Laid-Open No. 2006-111650 A
Patent Literature 2: Japanese Patent Application Laid-Open No. 2006-142561 A
Patent Literature 3: Japanese Patent Application Laid-Open No. 2006-143799 A
Patent Literature 4: International Publication No. 2008/146924 (foreign publication corresponding thereto: U.S. Patent Application Publication No. 2010/283949)
Patent Literature 5: Japanese Patent Application Laid-Open No. Hei. 05-164920 A

SUMMARY

Technical Problem

Since display devices may be used in a place such as an interior of vehicles where the temperatures reach extremely high level, the components that may be used in display devices need to be highly heat resistant.

An example of the components used in display devices is a phase difference film disposed for the purpose of improving viewing angle properties such as viewing angle compensation and reflection suppression. A phase difference film needs to have, in addition to heat resistance, an NZ factor of more than 0 and less than 1. Furthermore, the NZ factor is preferably 0.5 or close to 0.5.

An example of the method for producing a phase difference film having such an NZ factor is a method of combining a large number of layers (Patent Literature 4). However, a phase difference film obtained by this method has a complicated structure, and therefore production thereof requires a high production cost, resulting in low productivity.

Another method for producing a phase difference film having such an NZ factor involves stretching a film having a large Rth/d value (for example, $0.5 \times 10^{-3}$ or more). Here, Rth means the thickness-direction retardation (nm) of the film, and d (nm) means the thickness of the film.

However, it has been difficult in prior art to obtain an optical film having both a large Rth/d value and a satisfactory heat resistance. As a result, it has been difficult to obtain a phase difference film having both an effect of improving viewing angle properties and heat resistance from known optical films.

Therefore, there is a demand for an optical film from which a phase difference film having a sufficient effect of improving viewing angle properties and heat resistance can be produced at low cost, and a method for producing such an optical film.

Solution to Problem

The present inventor intensively conducted research for solving the aforementioned problem. As a result, the present inventor has found that the aforementioned problem can be solved by an optical film which is formed of a resin C including a copolymer P containing a polymerization unit A and a polymerization unit B, in which a phase separation structure that expresses structural birefringence is contained, and the properties of a polymer (A) containing the polymerization unit A and the properties of a polymer (B) containing the polymerization unit B have a specific relationship. Thus, the present invention has been accomplished.

That is, the present invention provides the following.
(1) An optical film formed of a resin C including a copolymer P containing a polymerization unit A and a polymerization unit B, wherein
the optical film includes a phase separation structure that expresses structural birefringence,
the phase separation structure includes a phase (A) containing as a main component the polymerization unit A and a phase (B) containing as a main component the polymerization unit B, and
an absolute value |n(A)−n(B)| of a difference between a refractive index n(A) of a polymer (A) formed of the polymerization unit A and a refractive index n(B) of a polymer (B) formed of the polymerization unit B is 0.12 or more.
(2) The optical film according to (1), wherein an absolute value |Tg(A)−Tg(B)| of a difference between a glass transition temperature Tg(A) (° C.) of the polymer (A) and a glass transition temperature Tg(B) (° C.) of the polymer (B) is 180° C. or higher.
(3) The optical film according to (1) or (2), wherein the glass transition temperature Tg(A) (° C.) is 120° C. or higher.
(4) The optical film according to any one of (1) to (3), wherein the phase separation structure has a configuration of any of lamella, cylinder, and spheroid.
(5) The optical film according to any one of (1) to (4), wherein a distance between phases in the phase separation structure is 200 nm or less.
(6) The optical film according to any one of (1) to (5), wherein the copolymer P is a block copolymer having a block (A) containing as a main component the polymerization unit A and a block (B) containing as a main component the polymerization unit B.
(7) The optical film according to any one of (1) to (6), wherein the polymerization unit A is a unit represented by the following general formula (A):

in the formula, $R^C$ is a group selected from the group consisting of a phenyl group, a biphenylyl group, a naphthyl group, an anthracenyl group, a phenanthrenyl group, a naphthacenyl group, a pentacenyl group, and a terphenylyl group, and $R^1$ to $R^3$ are each independently one selected from the group consisting of a hydrogen atom and an alkyl group of 1 to 12 carbon atoms.

(8) The optical film according to (7), wherein a molar ratio of a polymerization unit HA, which is a hydrogenation product of the polymerization unit A, relative to the polymerization unit A in the copolymer P is 0/100 or more and 10/90 or less.

(9) The optical film according to any one of (1) to (8), wherein the polymerization unit B is a unit represented by the general formula (B-1) or a unit represented by the general formula (B-2):

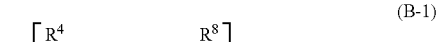

(B-1)

(B-2)

in the formula, $R^4$ to $R^9$ are each independently one selected from the group consisting of a hydrogen atom and an alkyl group of 1 to 6 carbon atoms.

(10) The optical film according to (9), wherein a total molar ratio of a unit represented by the following general formula (B'-1) and a unit represented by the following general formula (B'-2) relative to the polymerization unit B in the copolymer P is 0/100 or more and 10/90 or less:

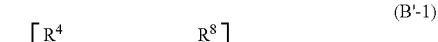

(B'-1)

(B'-2)

in the formula, $R^4$ to $R^9$ are the same definitions as those described above.

(11) The optical film according to any one of (1) to (10), wherein the polymerization unit A is a vinylnaphthalene unit, a vinylnaphthalene derivative unit, a styrene unit, or a styrene derivative unit, and the polymerization unit B is a unit that is a hydrogenation product of an isoprene unit, a unit that is a hydrogenation product of a butadiene unit, a unit that is a hydrogenation product of a 1,3-pentadiene unit, a unit that is a hydrogenation product of a 2,3-dimethyl-1,3-butadiene unit, a unit that is a hydrogenation product of a 1,3-hexadiene unit, a unit that is a hydrogenation product of a 2-methyl-1,3-pentadiene unit, a unit that is a hydrogenation product of a 3-methyl-1,3-pentadiene unit, or a unit that is a hydrogenation product of a 2,4-dimethyl-1,3-pentadiene unit.

(12) The optical film according to any one of (1) to (11), wherein the copolymer P includes a triblock copolymer P', and the triblock copolymer P' is a triblock copolymer of (A)-(B)-(A) having a block (A) containing as a main component the polymerization unit A and a block (B) containing as a main component the polymerization unit B.

(13) The optical film according to any one of (1) to (12), wherein the copolymer P has a negative intrinsic birefringence value.

(14) The optical film according to any one of (1) to (13), wherein the polymerization unit A has a negative intrinsic birefringence value, and the polymerization unit B has a positive intrinsic birefringence value.

(15) The optical film according to any one of (1) to (14), wherein a weight fraction of the polymerization unit A in the copolymer P is 50% by weight or more and less than 70% by weight.

(16) A method for producing the optical film according to any one of (1) to (15), comprising the steps of:

heating the resin C at 150° C. or higher to form a single-layer film of the resin C; and causing phase-separation of the resin C in the film.

(17) The method for producing the optical film according to (16), wherein the step of forming the film includes melt-extruding a single layer of the resin C.

(18) A method for producing a phase difference film comprising the step of stretching the optical film according to any one of (1) to (15) to obtain a phase difference film.

(19) The method for producing a phase difference film according to (18), wherein the optical film is produced by the method for producing the optical film according to (16) or (17).

Advantageous Effects of Invention

According to the present invention, there can be provided an optical film from which a phase difference film having a sufficient effect of improving viewing angle properties and heat resistance can be produced at low cost, and a method for producing such an optical film.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the film is not particularly limited, and may be 100,000 times or less the width, for example.

In the following description, a "plate" includes not only a rigid member but also a flexible member such as a resin film.

In the following description, a slow axis of a film or a layer represents an in-plane slow axis of the film or layer, unless otherwise specified.

In the following description, an angle formed by an optical axis (slow axis, transmission axis, absorption axis, etc.) of each layer in a member including a plurality of layers represents an angle when the layer is viewed from the thickness direction, unless otherwise specified.

In the following description, a front direction of a certain film means the normal direction of the principal surface of the film, specifically, a direction at the polar angle 0° and the azimuth angle 0° of the principal surface, unless otherwise specified.

In the following description, an oblique direction of a certain film means a direction which is neither parallel nor perpendicular to the principal surface of the film, specifically, a direction in a polar angle range of greater than 0° and lesser than 90° of the principal surface, unless otherwise specified.

In the following description, an in-plane retardation Re of a layer is a value represented by "Re=(nx−ny)×d" unless otherwise specified. A thickness-direction retardation Rth of a layer is a value represented by "Rth=[{(nx+ny)/2}−nz]×d" unless otherwise specified. An NZ factor of a layer is a value represented by "(nx−nz)/(nx−ny) unless otherwise specified. Herein, nx represents a refractive index in a direction in which the maximum refractive index is given among directions perpendicular to the thickness direction of the layer (in-plane directions), ny represents a refractive index in a direction, among the above-mentioned in-plane directions of the layer, perpendicular to the direction giving nx, nz represents a refractive index in the thickness direction of the layer, and d represents the thickness of the layer. The measurement wavelength is 590 nm, unless otherwise specified.

In the following description, a direction of an element being "parallel", "perpendicular" or "orthogonal" may allow an error within the range of not impairing the advantageous effects of the present invention, for example, within a range of ±3°, ±2°, or ±1°, unless otherwise specified.

The positivity or negativity of the intrinsic birefringence value of a polymer is defined by the behavior of the refractive index of a molded product of the polymer when the molded product has been stretched. That is, a polymer having a positive intrinsic birefringence value is a polymer in which the refractive index of the molded product thereof in the stretched direction is greater than before stretching. Also, a polymer having a negative intrinsic birefringence value is a polymer in which the refractive index of the molded product thereof in the stretched direction is smaller than before stretching. An intrinsic birefringence value may be calculated from a dielectric constant distribution.

That a certain specific polymerization unit has a positive intrinsic birefringence value means that a polymer formed only of the polymerization unit has a positive intrinsic birefringence value. That a certain specific polymerization unit has a negative intrinsic birefringence value means that a polymer formed only of the polymerization unit has a negative intrinsic birefringence value. Therefore, the positivity or negativity of the intrinsic birefringence value of a polymerization unit can be easily judged by preparing a homopolymer formed only of the polymerization unit, molding the polymer into a molded product having an optional shape, stretching the molded product, and measuring the optical properties thereof. In general, it is known that many of polymerization units of hydrocarbon such as alkene and diene have a positive intrinsic birefringence value, while many of polymers of hydrocarbon having an aromatic ring on the side chain such as styrene and vinylnaphthalene have a negative intrinsic birefringence value.

In the following description, a block in a polymer composed of a polymerization unit generated by polymerization of a certain monomer may be expressed using the name of the monomer. For example, a block composed of a polymerization unit generated by polymerization of 2-vinylnaphthalene may be referred to as a "2-vinylnaphthalene block", and a block composed of a polymerization unit generated by polymerization of isoprene may be referred to as an "isoprene block".

[1. Phase Difference Film]

The phase difference film of the present embodiment is formed of a resin C.

[1.1. Resin C]

The resin C includes a specific copolymer P. The copolymer P contains a polymerization unit A and a polymerization unit B. The copolymer P is preferably a block copolymer having a block (A) containing as a main component the polymerization unit A, and a block (B) containing as a main component the polymerization unit B. In general, a block copolymer is a polymer having a molecular structure in which a plurality of types of blocks are linked, and each block is a chain constituted by connection of polymerization units. A specific block copolymer in an embodiment of the present invention has specific blocks (A) and (B). In the following description, such specific block copolymers may simply be referred to as "block copolymers". Herein, the polymerization unit which is a main component in a certain block refers to a polymerization unit which is 50% by weight or more relative to the total weight of the polymerization units constituting the block.

The polymerization unit A may have a negative intrinsic birefringence value. On the other hand, the polymerization unit B may be a unit having a positive intrinsic birefringence value.

Examples of the polymerization unit A may be a unit having a unit represented by the following general formula (A).

(A)

$R^C$ is a group selected from the group consisting of a phenyl group, a biphenylyl group (e.g., a 4-biphenylyl group, a 2-biphenylyl group, and a 3-biphenylyl group), a naphthyl group (e.g., a 1-naphthyl group, and a 2-naphthyl group), an anthracenyl group (e.g., an anthracene-1-yl group, an anthracene-2-yl group, and an anthracene-9-yl group), a phenanthrenyl group (e.g., a phenanthrene-1-yl group, a phenanthrene-2-yl group, a phenanthrene-3-yl group, a phenanthrene-4-yl group, and a phenanthrene-9-yl group), a naphthacenyl group (e.g., a naphthacen-1-yl group, a naphthacen-2-yl group, and a naphthacen-5-yl group), a pentacenyl group (e.g., a pentacen-1-yl group, a pentacen- 2-yl group, a pentacen-5-yl group, and a pentacen-6-yl group), and a terphenylyl group.

$R^1$ to $R^3$ are each independently one selected from the group consisting of a hydrogen atom and an alkyl group of 1 to 12 carbon atoms. Examples of such alkyl groups may include a methyl group, an ethyl group, a propyl group, and a hexyl group.

In the formula (A), $R^1$ is preferably a hydrogen atom or a methyl group, more preferably a hydrogen atom.

$R^2$ and $R^3$ are preferably a hydrogen atom.

$R^C$ is preferably a naphthyl group or a phenyl group, more preferably a naphthyl group.

It is more preferable that $R^2$ and $R^3$ are a hydrogen atom and $R^C$ is a naphthyl group or a phenyl group, or $R^2$ and $R^3$ are a hydrogen atom and $R^1$ is a hydrogen atom. It is still more preferable that $R^2$ and $R^3$ are a hydrogen atom, $R^C$ is a naphthyl group, and $R^1$ is a hydrogen atom (a vinylnaphthalene unit). Alternatively, it is still more preferable that $R^1$, $R^2$ and $R^3$ are a hydrogen atom, and $R^C$ is a phenyl group (styrene unit). It is most preferable that $R^2$ and $R^3$ are a hydrogen atom, $R^C$ is a naphthyl group, and $R^1$ is a hydrogen atom.

The polymerization unit A may be obtained by polymerizing a monomer (a) that gives the polymerization unit A. Examples of the monomer (a) may include vinylnaphthalene and derivatives thereof, and styrene and derivatives thereof. As the monomer (a) that gives the polymerization unit A, vinylnaphthalene, a vinylnaphthalene derivative, styrene, and a styrene derivative are preferable. Thus, in an embodiment, the polymerization unit A is preferably a vinylnaphthalene unit, a vinylnaphthalene derivative unit, a styrene unit, or a styrene derivative unit.

Examples of the vinylnaphthalene may include 1-vinylnaphthalene and 2-vinylnaphthalene. Examples of the vinylnaphthalene derivative may include α-alkylvinylnaphthalene (e.g., α-methyl-1-vinylnaphthalene, α-ethyl-1-vinylnaphthalene, α-propyl-1-vinylnaphthalene, α-hexyl-1-vinylnaphthalene, α-methyl-2-vinylnaphthalene, α-ethyl-2-vinylnaphthalene, α-propyl-2-vinylnaphthalene, and α-hexyl-2-vinylnaphthalene). As the vinylnaphthalene and its derivatives, 2-vinylnaphthalene is preferable from the viewpoint of convenient industrial availability.

Examples of the styrene derivatives may include α-alkylstyrene (e.g., α-methylstyrene and α-ethylstyrene). As styrene and its derivatives, styrene is preferable from the viewpoint of convenient industrial availability.

As the polymerization unit A, the copolymer P may have one type thereof solely, and may also have two or more types thereof in combination at any ratio. Therefore, as the monomer (a) for forming the polymerization unit A, one type thereof may be solely used, and two or more types thereof may also be used in combination at any ratio.

The copolymer P may contain a polymerization unit that is a hydrogenation product of the polymerization unit A. The polymerization unit that is a hydrogenation product of the polymerization unit A is a polymerization unit that has a structure of a hydrogenation product of the polymerization unit A. Hereinafter, a polymerization unit that is a hydrogenation product of the polymerization unit A is also referred to as a polymerization unit HA. The polymerization unit HA may be a unit produced by any method.

Examples of the polymerization unit HA may include a unit obtained by adding a hydrogen atom to part or all of unsaturated bonds included in the group represented by $R^C$ in the unit represented by the general formula (A).

The molar ratio (HA/A) of the polymerization unit HA relative to the polymerization unit A in the copolymer P is preferably 10/90 or less, more preferably 5/95 or less, still more preferably 2/98 or less, and most preferably 1/99 or less, and may be 0/100 or more, but is ideally 0/100. The molar ratio (HA/A) in the copolymer P may be determined by measuring $^1$H-NMR of the copolymer P.

When a plurality of types of the polymerization units HA are contained in the copolymer P, the molar ratio (HA/A) means the sum of the respective molar ratios of the plurality of types of the polymerization units HA. When a plurality of types of the polymerization units A are contained in the copolymer P, the molar ratio (HA/A) means the molar ratio of the polymerization unit HA relative to the total molar number of the plurality of types of the polymerization units A.

Examples of the polymerization unit B may include a unit represented by the following general formula (B-1) and a unit represented by the following general formula (B-2).

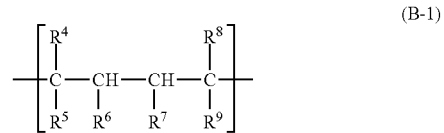

(B-1)

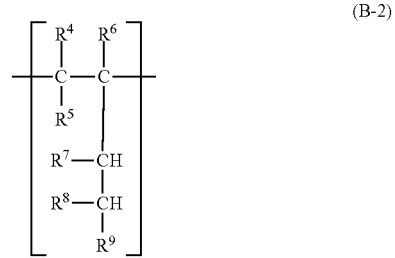

(B-2)

$R^4$ to $R^9$ are each independently a hydrogen atom or one selected from the group consisting of an alkyl group of 1 to 6 carbon atoms. Examples of such alkyl groups may include a methyl group, an ethyl group, a propyl group, and a hexyl group. Preferably, $R^4$ to $R^9$ are each independently a hydrogen atom or a methyl group.

The polymerization unit B may be obtained by polymerizing a monomer (b) which is capable of giving a polymerization unit B to form a polymerization unit, and further hydrogenating double bonds if such double bonds are present in the polymerization unit. Examples of the monomer (b) may include compounds represented by the following general formula (bm).

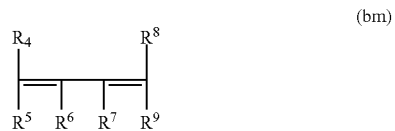

(bm)

In the above-described general formula (bm), the definitions for $R^4$ to $R^9$ are the same as those in the general formula (B-1) and the general formula (B-2).

Preferable examples of the monomers (b) may include butadiene ($R^4$ to $R^9$ in the formula (bm) are all hydrogen atoms), isoprene ($R^6$ or $R^7$ of $R^4$ to $R^9$ in the formula (bm) is a methyl group and the others are hydrogen atoms), 1,3-pentadiene, 2,3-dimethyl-1,3-butadiene, 1,3-hexadiene, 2-methyl-1,3-pentadiene, 3-methyl-1,3-pentadiene, and 2,4-dimethyl-1,3-pentadiene. Of these, butadiene and isoprene are more preferable from the viewpoint of obtaining a resin C excellent in transparency, heat resistance, and processability. Preferable examples of the polymerization unit B may include those having the same $R^4$ to $R^9$ as those in the preferable examples of the monomer (b). More preferable examples of the polymerization unit B may include a unit that is a hydrogenation product of an isoprene unit, a unit that is a hydrogenation product of a butadiene unit, a unit that is a hydrogenation product of a 1,3-pentadiene unit, a unit that is a hydrogenation product of a 2,3-dimethyl-1,3-butadiene unit, a unit that is a hydrogenation product of a 1,3-hexadiene unit, a unit that is a hydrogenation product of a 2-methyl-1,3-pentadiene unit, a unit that is a hydrogenation product of a 3-methyl-1,3-pentadiene unit, and a unit that is a hydrogenation product of a 2,4-dimethyl-1,3-pentadiene unit.

Herein, a unit that is a hydrogenation product of a certain unit is a unit that has a structure obtained by hydrogenating the certain unit. A unit that is a hydrogenation product of a certain unit may be a unit produced by an optional method.

As the polymerization unit B, the copolymer P may have one type thereof solely, and may also have two or more types thereof in combination at any ratio. Therefore, as the monomer (b) for forming the polymerization unit B, one type thereof may be solely used, and two or more types thereof may also be used in combination at any ratio.

The copolymer P may contain a polymerization unit hydrogenation of which gives the polymerization unit B. The polymerization unit hydrogenation of which gives the polymerization unit B is a polymerization unit that has a structure of dehydrogenation product the polymerization unit B. Hereinafter, a polymerization unit hydrogenation of which gives the polymerization unit B is also referred to as a polymerization unit B'. The polymerization unit B' may be a unit produced by any method.

Examples of the polymerization unit B' may include a unit represented by the following general formula (B'-1) and a unit represented by the following general formula (B'-2).

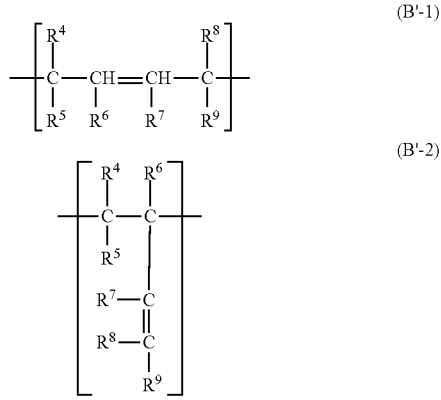

In the general formula (B'-1) and the general formula (B'-2), the definitions for the $R^4$ to $R^9$ are the same as those in the general formula (B-1) and the general formula (B-2).

The molar ratio (B'/B) of the polymerization unit B' relative to the polymerization unit B in the copolymer P is preferably 10/90 or less, more preferably 5/95 or less, still more preferably 2/98 or less, and most preferably 1/99 or less, and may be 0/100 or more, but is ideally 0/100. In the copolymer P, the molar ratio (B'/B) may be determined by measuring the NMR of the copolymer P.

When a plurality of types of the polymerization units B' are contained in the copolymer P, the molar ratio (B'/B) means the sum of the respective molar ratios of the plurality of types of polymerization units B'. When a plurality of types of polymerization units B are contained in the copolymer P, the molar ratio (B'/B) means the molar ratio of the polymerization unit B' relative to the total molar number of the plurality of types of the polymerization units B.

Therefore, when the polymerization unit B is a unit represented by the general formula (B-1) or a unit represented by the general formula (B-2), and the polymerization unit B' is a unit represented by the general formula (B'-1) or a unit represented by the general formula (B'-2), the molar ratio (B'/B) in the copolymer P is a total molar ratio of a unit represented by the general formula (B'-1) and a unit represented by the general formula (B'-2) relative to a total molar number of a unit represented by the general formula (B-1) and a unit represented by the general formula (B-2), that is, a sum of the molar ratio of the unit represented by the general formula (B'-1) and the molar ratio of the unit represented by the following general formula (B'-2).

When the copolymer P has the block (A), the block (A) may have an optional polymerization unit other than the polymerization unit A. Examples of such optional polymerization units may include a unit formed by polymerization of an optional monomer copolymerizable with the monomer (a), and a unit formed by hydrogenation of the unit.

When the copolymer P has a block (B), the block (B) may have an optional polymerization unit other than the polymerization unit B. Examples of such optional polymerization units may include a polymerization unit obtained by polymerizing a monomer (b) and having a double bond remained without being hydrogenated, and a unit formed by polymerization of an optional monomer copolymerizable with the monomer (b) and a unit formed by hydrogenation of the unit.

However, from the viewpoint of expression of optical properties and mechanical properties of the resin C, it is preferable that both of the ratio of the polymerization unit A in the block (A) and the ratio of the polymerization unit B in the block (B) are high. The ratio of the polymerization unit A in the block (A) is preferably 50% by weight or more, more preferably 75% by weight or more, and still more preferably 95% by weight or more, and particularly preferably, the block (A) is formed only of the polymerization unit A. The ratio of the polymerization unit B in the block (B) is preferably 50% by weight or more, more preferably 75% by weight or more, and still more preferably 95% by weight or more, and particularly preferably, the block (B) is formed only of the polymerization unit B.

The block (A) and the block (B) are preferably incompatible. When these blocks are incompatible, a phase separation structure can be easily obtained in a phase difference film. Whether the block (A) and the block (B) are incompatible or not may be judged based on presence or absence of the compatibility between a homopolymer formed of the polymerization unit A and a homopolymer formed of the polymerization unit B, which have molecular weights that are at the same levels as the sizes of these blocks in the block copolymer. Presence or absence of the compatibility between such homopolymers may be judged by mixing these homopolymers to obtain a mixture and judging whether these are phase-separated when placed at a temperature at which these are in a melting state.

The molecular structure of the copolymer P is not particularly limited as long as it has the polymerization unit A and the polymerization unit B, and may be a molecular structure having any optional configuration. For example, when the copolymer P is a block copolymer, the block copolymer may be a linear block copolymer or a graft block copolymer.

Examples of linear block copolymers may include a diblock copolymer having a block configuration (A)-(B) in which blocks (A) and (B) are connected to each other; a triblock copolymer having a block configuration (A)-(B)-(A) in which a block (A), a block (B), and another block (A) are connected to each other in this order (herein, sometimes referred to as "triblock copolymer P'"); a pentablock copolymer having a block configuration in which three blocks (A) and two blocks (B) are connected in the order of (A)-(B)-(A)-(B)-(A); and a linear block copolymer having a block configuration in which a greater number of blocks are connected. Examples of the block configurations in which a large number of blocks are connected may include (A)-((B)-(A))n-(B)-(A), and (B)-((A)-(B))n-(A)-(B) (n is an integer greater than or equal to 1).

Examples of the graft block copolymer may include a block copolymer having a block configuration of (A)-g-(B) in which the block (B) is connected to the block (A) as a side chain.

From the viewpoint of causing the resin C to express desired optical properties, the copolymer P may preferably be a block copolymer having a molecular structure having two or more polymer blocks (A) and one or more polymer blocks (B) per molecule. More preferably, the block copolymer may be a triblock copolymer with the block configuration of (A)-(B)-(A).

The weight fraction of the polymerization unit A in the copolymer P may be adjusted to a value with which desired optical properties are expressed. The weight fraction of the polymerization unit A refers to the weight of the polymerization unit A relative to the total weight of the polymerization units constituting the copolymer P. When the resin C includes a plurality of types of copolymer P, the weight fraction of the polymerization unit A referred to herein is the weight of the polymerization unit A relative to the total weight of the polymerization units in the entire plurality of types of copolymer P contained. The weight fraction of the polymerization unit A in the copolymer P is preferably 50% by weight or more, more preferably 53% by weight or more, and still more preferably 55% by weight or more, and is preferably less than 70% by weight, more preferably less than 69% by weight, still more preferably 68% by weight or less, and particularly preferably less than 68% by weight, and is preferably 50% by weight or more and less than 70% by weight, more preferably 55% by weight or more and less than 68% by weight. When the weight fraction of the polymerization unit A in the copolymer P is equal to or higher than the lower limit value, the phase difference film produced from the optical film can have still better heat resistance. When the weight fraction of the polymerization unit A in the copolymer P is equal to or lower than the above-mentioned upper limit value, the phase difference film produced from the optical film can have still better viewing angle properties.

The molecular weight of the copolymer P is not particularly limited, and may be appropriately adjusted to a range in which preferable optical properties and mechanical properties can be obtained. The molecular weight of the copolymer P may be, for example, in the range of 50,000 to 400,000. In addition, the glass transition temperature Tg of the copolymer P may be, for example, in the range of 110° C. to 150° C. The glass transition temperature Tg of the copolymer P may be determined by thermomechanical analysis (TMA).

It is preferable that the copolymer P has a negative intrinsic birefringence value. Such negative intrinsic birefringence values may be imparted by adjusting the ratio of the polymerization units in the copolymer P. Specifically, by adopting a unit having a negative intrinsic birefringence value as the polymerization unit A, and adjusting the weight fraction of the polymerization unit A within a range of the above-described lower limit or more, it is possible to obtain the copolymer P having a negative intrinsic birefringence value. The copolymer P having a negative intrinsic birefringence value can impart desired optical properties to the phase difference film.

The resin C may be formed only of the copolymer P, and may include an optional component in addition to the copolymer P. Examples of the optional components may include additives such as a dye, a pigment, and an antioxidant. The ratio of such optional components may be within the range that does not impair the advantageous effects of the present invention. Specifically, the ratio of the copolymer P in the resin C is preferably 98% by weight or more, and more preferably 99% by weight or more, and is usually 100% by weight or less. More preferably, the resin C is formed only of the copolymer P.

[1.2. Structure Contained in Optical Film and Properties and Others of Optical Film]

The optical film of the present embodiment contains a phase separation structure that expresses structural birefringence. The phase separation structure is formed in the layer of the resin C constituting the optical film. The phase separation structure of the resin C means that a portion composed of the polymerization unit A (for example, the block (A)) and a portion composed of the polymerization unit B (for example, the block (B)) of the copolymer P in the resin C are self-assembled, and a phase containing as a main component the polymerization unit A (also referred to as a phase (A)) and a phase containing as a main component the polymerization unit B (also referred to as a phase (B)) are thereby separated into distinguishable separate phases in the layer. In the following description, these phases are sometimes merely referred to as a "phase of the polymerization unit A" and a "phase of the polymerization unit B". An orientation layer exhibiting such a phase separation structure can express structural birefringence when the structure is sufficiently smaller than the wavelength of light.

Structural birefringence is birefringence caused in structures containing multiple types of phases having different refractive indices, such as the aforementioned phase separation structure. For example, when a certain structure includes, in a phase having a certain refractive index n1, a phase having a refractive index n2 which is different from n1, the structure can express structural birefringence. Structural birefringence is clearly different from orientational birefringence which is caused by the molecular orientation due to stretching, as the structural birefringence occurs even when each phase is formed with an isotropic medium.

Actual occurrence of structural birefringence may be confirmed by measuring optical properties of the film. Since an unstretched film formed by a conventional method such as extrusion molding, pressing, or solvent casting usually has a random molecular orientation, its Re and Rth values are close to 0. On the other hand, in an unstretched film expressing structural birefringence, the observed Re and Rth values are greater than the values observed in an ordinary unstretched film formed by the conventional method. Therefore, expression of structural birefringence can be confirmed by measuring such values. Specifically, when the Rth/d of an unstretched film is $0.5 \times 10^{-3}$ or more, it may be judged that structural birefringence is expressed in the unstretched film. However, expression of structural birefringence can be confirmed more reliably by additionally performing structure observation by an electron microscope or small-angle X-ray scattering.

Specific examples of the phase separation structure may include a lamellar structure, a spheroid structure, and a cylinder structure. Which of these phase separation structures is expressed is influenced by various factors. A main factor that influences the expression of the structure is a volume ratio between a phase containing as a main component the polymerization unit A and a phase containing as a main component the polymerization unit B. The volume ratio between these phases may be adjusted by changing the ratio between the blocks (A) and (B) in the block copolymer. The phase separation structure is preferably a cylinder structure or a lamellar structure.

In the phase separation structure, the size of the structure may be appropriately adjusted within a range in which the optical film can exert desired optical properties. For example, the distance between phases is preferably 200 nm or less, more preferably 150 nm or less, and further preferably 100 nm or less. The size of each of phase-separated phases is preferably 100 nm or less, more preferably 80 nm or less, and further preferably 60 nm or less. The distance between phases indicates, for example, the distance between a lamella and another lamella (that is, the pitch of a repeating unit of a lamellar layer) in a case of a lamella-shape phase separation, the distance between a cylinder and another cylinder in a case of a cylinder-shape phase separation structure, and the distance between a spheroid and another spheroid in a case of a spheroid-shape phase separation structure. The size of the phase-separated phase indicates the thickness of a lamella in a case of lamella-shape phase separation, the cylinder radius in a case of cylinder-shape phase separation, and the spheroid radius in a case of spheroid-shape phase separation structure. As the distance between phases, a value obtained by fitting a scattering pattern obtained through small-angle X-ray scattering measurement to a theoretical curve may be adopted.

When the distance between phases and the size of the phase-separated phase are sufficiently shorter than visible light in this manner, structural birefringence is expressed, and the coloring of the film and the decrease of light transmittance can be suppressed. The lower limit of the distance between phases may be, for example, 10 nm or more, although the lower limit is not restricted thereto. The lower limit of the size of the phase-separated phase may be, for example, 10 nm or more, although the lower limit is not limited thereto. The distance between phases may be adjusted by adjusting the molecular structure of the copolymer P. For example, the adjustment may be effected by adopting a block copolymer as the copolymer P and appropriately adjusting factors such as the lengths of the blocks (A) and (B).

The greater the absolute value $|n(A)-n(B)|$ of the difference between the refractive index n(A) of the polymer (A) formed of the polymerization unit A and the refractive index n(B) of the polymer (B) formed of the polymerization unit B is, the more efficiently structural birefringence can be expressed, and the better the viewing angle properties of the phase difference film produced from the resulting optical film becomes.

$|n(A)-n(B)|$ is preferably 0.12 or more, more preferably 0.14 or more, and still more preferably 0.16 or more. The greater value is more preferable, and the absolute value may be 0.25 or less. The refractive index may be measured by, for example, a prism coupler method.

The polymer (A) formed of the polymerization unit A may be obtained by polymerizing a monomer corresponding to the polymerization unit A and, if necessary, further performing a reaction such as hydrogenation. The polymer (B) formed of the polymerization unit B may be obtained by polymerizing a monomer corresponding to the polymerization unit B and, if necessary, further performing a reaction such as hydrogenation. When the copolymer P includes the block (A) and the block (B), the polymer (A) and the polymer (B) may be obtained in the same manner as the producing methods for the block (A) and the block (B), respectively.

The greater the absolute value $|Tg(A)-Tg(B)|$ of the difference between the glass transition temperature Tg(A) (° C.) of the polymer (A) and the glass transition temperature (Tg(B) (° C.) of the polymer (B) is, the more viewing angle properties and heat resistance of the phase difference film produced from the resulting optical film are balanced.

$|Tg(A)-Tg(B)|$ is preferably 180° C. or higher, more preferably 190° C. or higher, and still more preferably 200° C. or higher. The greater value is more preferable, and the absolute value may be 275° C. or less. The glass transition temperature of the polymer (A) and the polymer (B) may be measured, for example, by differential scanning calorimetry. The measuring condition may be a temperature rise rate of 10° C./minute based on JIS K 6911.

The content ratio of the polymerization unit A in the phase containing as a main component the polymerization unit A and the content ratio of the polymerization unit B in the phase containing as a main component the polymerization unit B may be adjusted by appropriately adjusting the materials for producing the copolymer P and the producing operation. The content ratio is preferably a high value in terms of expression of the effects. The content ratio of the polymerization unit A in the phase containing as a main component the polymerization unit A is preferably 50% by weight or more, and more preferably 75% by weight or more, and is usually 100% by weight or less, and still more preferably 100% by weight. The content ratio of the polymerization unit B in the phase containing as a main component the polymerization unit B is preferably 50% by weight or more, and more preferably 75% by weight or more, and is usually 100% by weight or less, and still more preferably 100% by weight.

The glass transition temperature Tg(A) (° C.) of the polymer (A) is preferably 120° C. or higher, more preferably 130° C. or higher, and still more preferably 140° C. or higher, and may be 180° C. or lower. By selecting the polymerization unit A with which the glass transition temperature Tg(A) (° C.) of the polymer (A) falls within the aforementioned range, heat resistance of the phase difference film can be effectively improved.

In the optical film, the value of Rth/d calculated from the thickness-direction retardation Rth (nm) of the film and the film thickness (nm) is preferably $0.5 \times 10^{-3}$ or more, more preferably $1.0 \times 10^{-3}$ or more, and still more preferably $1.5 \times 10^{-3}$ or more, and is preferably $8.0 \times 10^{-3}$ or less, more preferably $7.0 \times 10^{-3}$ or less, and still more preferably $6.5 \times 10^{-3}$ or less. It is preferably $1.0 \times 10^{-3}$ or more and $8.0 \times 10^{-3}$ or less. By setting the Rth/d value within the aforementioned range, an optical film capable of producing a phase difference film having excellent viewing angle properties can be obtained.

The thickness of the optical film may be appropriately set depending on the stretching conditions in the subsequent stretching step, the purpose of use, and the like. The thickness is preferably 150 µm or less, and more preferably 100 µm or less, and may be greater than 0 µm and greater than or equal to 10 µm.

The Rth/d of the optical film may be adjusted by adjusting the value of |n(A)−n(B)| as described above. More specifically, Rth/d may be increased by increasing the value of |n(A)−n(B)|. Further, Rth/d of the optical film may be increased by reducing the weight fraction of the polymerization unit A in the copolymer P.

[2. Method for Producing Optical Film]

The aforementioned optical film may be produced by a production method including a step of forming a single-layer film of a resin C and a step of causing phase-separation of the resin C in such a film.

Examples of a specific film forming method for performing the step of forming a film of a resin C may include a solution casting method, a melt extrusion method, a calendar method, and a compression molding method (press molding method). For efficiently producing a large amount of optical films, a melt extrusion method is particularly preferable.

A method for forming a film by a melt extrusion method usually involves extrusion of a resin melted in an extruder through a die and thereafter casting the extruded resin on a cooling roll.

The extrusion speed of the resin from the die may be adjusted by adjusting the screw rotation speed of the extruder. The screw rotation speed of the extruder is preferably 10 rpm or more and more preferably 20 rpm or more, and preferably 80 rpm or less and more preferably 60 rpm or less. When the screw rotation speed of the extruder falls within the aforementioned range, the phase separation structure of the resin C can be easily formed.

The temperature of the cooling roll is preferably 120° C. or higher and more preferably 130° C. or higher, and preferably 150° C. or lower and further preferably 145° C. or lower.

In any method, the step of forming the film of the resin C is usually performed while heating the resin C. In the step of forming the film of the resin C, the heating temperature of the resin C is usually 100° C. or higher, preferably 150° C. or higher, more preferably 180° C. or higher, and further preferably 200° C. or higher, and preferably 320° C. or lower, more preferably 300° C. or lower, and further preferably 290° C. or lower.

The step of causing phase-separation of the resin C in the film may be performed either after or simultaneously with the step of forming the film.

The step of phase-separation may be performed by, for example, slowly cooling the melted resin C. Specifically, when a melt extrusion method and other methods are adopted as the step of forming the film, an operation of molding a resin in a melted state and thereafter cooling the molded resin under slow cooling conditions may be performed. Although the specific action mechanism is not clear, the phase separation structure of the resin C that expresses structural birefringence can be easily formed by such slow cooling, and thereby the optical film having desired optical properties can be easily obtained.

As the step of phase-separation, a step of pressing the film may be performed in addition to or in place of the aforementioned slow cooling. When a pressure is applied to the film of the resin C, the phase separation structure that expresses structural birefringence can be easily formed, and the optical film having desired optical properties can be easily obtained.

Specifically, the step of pressing may be performed by applying a pressure to a sheet piece-shape resin C in its thickness direction. For such an operation, a pressing tool, such as a die, to apply a pressure onto the surface of the film may be used. When the film of the resin C is formed by a press molding method, the step of pressing may be performed either simultaneously with molding as a part of the step of molding, or after molding.

The step of pressing may also be performed with a device which continuously applies a pressure on a long-length resin C. For such an operation, a pressing tool such as a pressing roll may be used. When the film of the resin C is molded by a melt extrusion method, the step of pressing may be performed by feeding the resin C extruded from the die between two pressing rolls, to thereby apply a pressure on the resin C. A film having a uniform thickness and phase separation structure can be obtained by appropriately adjusting pressing conditions such as a linear pressure and a temperature of pressing.

[3. Uses of Optical Film]

[3.1. Properties of Phase Difference Film Producible from Optical Film]

The aforementioned optical film as it is may be used for various optical uses. Alternatively, the aforementioned optical film may be stretched to produce a phase difference film with excellent viewing angle properties.

[3.2. Method for Producing Phase Difference Film]

The aforementioned optical film may be stretched to produce a phase difference film with excellent heat resistance and improved viewing angle properties. The step of stretching may be performed on a line continuous to a production line for molding the film of the resin C. Alternatively, the produced film of the resin C may be temporarily wound up to form a film roll. The film may be thereafter unwound from the film roll, and subjected to the step of stretching. The step of stretching is usually performed by a flat method stretching in which the film is stretched in its in-plane direction. Examples of the flat method stretching may include a uniaxial stretching method and a biaxial stretching method. The uniaxial stretching method involves stretching of a film in one of its in-plane directions. Examples thereof may include a free width uniaxial stretching method and a constant width uniaxial stretching method. The biaxial stretching method involves the stretching a film in two of its in-plane directions. Examples of the biaxial stretching method may include a sequential biaxial stretching method and a simultaneous biaxial stretching method. The stretching in each direction may be either free width stretching or constant width stretching. More specific examples of the sequential biaxial stretching method may include an all tenter system and a roll tenter system. The stretching method for the step of stretching in the production method of the present embodiment may be any of these methods, and an appropriate method for achieving a desired phase difference film may be selected.

EXAMPLE

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified.

[Evaluation Method]
(Retardation and Rth/d of Film)

Using AxoScan manufactured by Axometrics Inc., the thickness-direction retardation Rth of the film was obtained at a wavelength of 590 nm.

From the obtained Rth (nm) and the thickness d (nm) of the film, Rth/d was obtained.

(Phase Separation Structure)

The film was cut into a size of 2 mm×4 mm to obtain a plurality of film pieces. 30 pieces thereof were stacked in the thickness direction and fixed to a folder. Then, small-angle X-ray scattering measurement was performed in a small-angle X-ray scattering measurement facility (Aichi SR, beamline 8S3) to obtain a scattering pattern. The measurement conditions were camera length: 4 m, X-ray energy: 8.2 KeV, measurement q range: about 0.06 to 3 $nm^{-1}$, and exposure time to light per sample: 60 seconds. Fitting of the obtained scattering pattern to the theoretical curve was performed, and therefrom the phase separation structure and the distance between phases were calculated.

The surface irradiated with X-ray was the cross section of the film, and the integration range was 20° in each of the thickness direction and a direction perpendicular to the thickness direction. The distance between phases was calculated from data obtained from each integration, and an average value of the distances between phases in the thickness direction and the direction perpendicular to the thickness direction was adopted as a measurement value.

(Presence or Absence of Structural Birefringence)

When the phase separation structure was observed in the film by the aforementioned method, and Rth/d of the film was $0.5 \times 10^{-3}$ or more, it was evaluated that the structural birefringence is "present". When phase separation was not observed, or when phase separation was observed although Rth/d of the film was less than $0.5 \times 10^{-3}$, it was evaluated that the structural birefringence is "absent".

(Refractive Index)

The refractive index at a wavelength of 532 nm of the sample was obtained by measuring refractive indices at three wavelengths of 407 nm, 532 nm, and 633 nm using a refractive index film thickness measuring device ("Prism Coupler" manufactured by Metricon Corporation) and performing Cauchy fitting of the measured values.

(Measurement of Glass Transition Temperature by Differential Scanning Calorimetric Analysis (DSC))

The glass transition temperature (Tg) of the sample was measured using a differential scanning calorimeter (manufactured by SII Nano Technology Inc., product name: DSC6220), in accordance with JIS K 6911, under the condition of a temperature increasing rate of 10° C./min.

(Measurement of Glass Transition Temperature by Thermomechanical Analysis (TMA))

From the film to be measured, a 5 mm×20 mm rectangular sample was cut out. The sample was mounted to a thermomechanical analyzer ("TMA/SS7100" manufactured by SII Nano Technology Inc.). The temperature was changed while a tension of 50 mN was applied to the sample in the lengthwise direction thereof, and the temperature at the inflection point of linear expansion was adopted as Tg (° C.).

(Positivity or Negativity of Intrinsic Birefringence Value of Copolymer)

A film was produced from the copolymer. The positivity or negativity of the intrinsic birefringence value of the copolymer was determined by the behavior of the refractive index upon stretching the film. When the refractive index of the film after stretching in the stretched direction was greater than that before stretching, the intrinsic birefringence of the copolymer was determined as positive. When the refractive index of the film after stretching in the stretched direction was smaller than that before stretching, the intrinsic birefringence of the copolymer was determined as negative.

(Evaluation of Viewing Angle Properties)
(Display Properties (λ/4 Plate))

As a polarizing plate, a long-length polarizing plate having a transmission axis in its width direction (manufactured by Sanritz Corporation, trade name "HLC2-5618S", thickness 180 μm) was prepared. The protective film on one surface of the polarizing plate was removed, and the phase difference film as the λ/4 plate to be evaluated was bonded to the surface. The bonding was performed such that the slow axis direction of the phase difference film and the transmission axis direction of the polarizing plate form an angle of 45°. By this operation, a polarizing plate including the phase difference film to be evaluated as one of the protective films on both surfaces was obtained. A polarizing plate originally disposed on the viewing side of a commercially available organic electroluminescence (EL) display device (manufactured by LG Electronics Inc., OLED55EG9600) was replaced with the obtained polarizing plate. Accordingly, an organic EL display device including the phase difference film to be evaluated was obtained. In replacing, the polarizing plate was disposed such that the side thereof having a phase difference film to be evaluated was on the organic EL element side. The transmission axis of the polarizer was set in the same direction as that of a polarizer in the polarizing plate that had originally been disposed in the organic EL display device.

The display state of the obtained organic EL display device was observed from an oblique direction with respect to the display surface (45° to the normal direction) at various azimuth angles, and the display state was evaluated according to the following criteria.

Excellent: Reflectivity reduced in all directions compared to that before replacement.
Good: Reflectivity reduced in one or more directions compared to that before replacement.
Poor: Reflectivity increased in one or more directions compared to that before replacement.

(Evaluation of Heat Resistance)

The heat resistance of the film to be evaluated was evaluated by heat softening temperature Ts. Ts was measured by thermomechanical analysis (TMA) in accordance with the following procedure. The film to be evaluated was cut into the shape of 5 mm×20 mm to obtain a sample. The temperature was varied while a tension of 50 mN was applied to the sample in the lengthwise direction thereof using a thermomechanical analyzer "TMA/SS7100" (manufactured by SII Nano Technology Inc.). The temperature (° C.) when the linear expansion had changed by 3% was recorded as the heat softening temperature Ts. From the measured heat softening temperature Ts, the heat resistance of the film to be evaluated was evaluated according to the following criteria.

Good: Ts is 120° C. or higher.
Poor: Ts is lower than 120° C.

Reference Example 1

(R1-1. Isoprene Homopolymer (PI))

Into a reaction vessel equipped with a stirrer, which had been sufficiently replaced with a nitrogen gas, 395 parts of dehydrated cyclohexane, 120 parts of dehydrated isoprene, and 0.77 part of n-butyl ether were charged. Under stirring at 50° C., 1.25 parts of n-butyl lithium (15% n-hexane solution) was added to initiate polymerization. The polymerization reaction was continued for 60 minutes. The polymerization conversion rate at this point was almost 100%. Then, 0.2 part of methanol was added to terminate the reaction. A part of the obtained polymer solution was extracted and dried to obtain a homopolymer of isoprene (PI). The obtained homopolymer of isoprene (PI) had a molecular weight distribution (Mw/Mn) of 1.07 and a weight-average molecular weight (Mw) of 76000. For the polymer (PI), the refractive index and the glass transition temperature on the basis of DSC were measured by the aforementioned method. The measurement results are shown in Table 1.

(R1-2. Hydrogenated Product of Isoprene Homopolymer (HPI))

The obtained polymer solution was transferred into a pressure resistant reaction vessel equipped with a stirrer. To the polymer solution, 1.5 parts of a silica-alumina supported nickel catalyst (product name: T-8400RL, manufactured by Clariant Catalysts K.K., nickel containing amount 33%) as a hydrogenation catalyst and 100 parts of dehydrated cyclohexane were added and mixed. The reaction vessel was replaced with a hydrogen gas in a normal temperature state, and the temperature was increased to 170° C. in a state of being pressurized at a gauge pressure of 2 MPa. When the inside temperature of the pressure resistance reaction vessel reached 170° C., the hydrogen pressure was increased to 4.5 MPa, and a hydrogenation reaction was performed for 12 hours (hydrogenation rate: 99.9%). The resulting solution after hydrogenation was dried to obtain a hydrogenated product of a homopolymer of isoprene (HPI). For the polymer (HPI), the refractive index and the glass transition temperature on the basis of DSC were measured by the aforementioned method. The measurement results are shown in Table 1.

Reference Example 2

(R2-1. Butadiene Homopolymer (PB))

Into a reaction vessel equipped with a stirrer, which had been sufficiently replaced with a nitrogen gas, 395 parts of dehydrated cyclohexane, 120 parts of butadiene, and 0.77 part of n-butyl ether were charged. Under stirring at 20° C., 1.25 parts of n-butyl lithium (15% n-hexanoic solution) was added to initiate polymerization. The polymerization reaction was continued for 60 minutes. The polymerization conversion rate at this point was almost 100%. Then, 0.2 part of methanol was added to terminate the reaction. A part of the obtained polymer solution was extracted and dried to obtain a homopolymer of butadiene (PB). The obtained homopolymer of butadiene (PB) had a molecular weight distribution (Mw/Mn) of 1.27 and a weight-average molecular weight (Mw) of 96000.

(R2-2. Hydrogenated Product of Butadiene Homopolymer (HPB))

The obtained polymer solution was transferred into a pressure resistant reaction vessel equipped with a stirrer. To the polymer solution, 1.5 parts of a silica-alumina supported nickel catalyst (product name: T-8400RL, manufactured by Clariant Catalysts K.K., nickel containing amount 33%) as a hydrogenation catalyst and 100 parts of dehydrated cyclohexane were added and mixed. The reaction vessel was replaced with a hydrogen gas in a normal temperature state, and the temperature was increased to 170° C. in a state of being pressurized at a gauge pressure of 2 MPa. When the inside temperature of the pressure resistance reaction vessel reached 170° C., the hydrogen pressure was increased to 4.5 MPa, and a hydrogenation reaction was performed for 12 hours (hydrogenation rate: 99.9%). The resulting solution after hydrogenation was dried to obtain a hydrogenated product of a homopolymer of butadiene (HPB). For the hydrogenated product (HPB), the refractive index and the glass transition temperature on the basis of DSC were measured by the aforementioned method. The measurement results are shown in Table 1.

Reference Example 3

(2-Vinylnaphthalene Homopolymer (PVN))

Into a pressure resistant reaction vessel dried and replaced with a nitrogen gas, 500 parts of toluene as a solvent and 0.03 part of n-butyl lithium as a polymerization catalyst were charged. After that, 36 parts of 2-vinylnaphthalene was added. The mixture was reacted at 25° C. for 2 hours for performing a polymerization reaction. As a result, a polymer (PVN) was obtained in the reaction mixture. The reaction mixture was poured into a large amount of 2-propanol to thereby cause precipitation of the polymer (PVN), which was then isolated.

The obtained polymer (PVN) was analyzed by $^1$H-NMR. As a result, the polymer (PVN) was formed only of a 2-vinylnaphthalene unit. Therefore, the polymer (PVN) was a homopolymer of 2-vinylnaphthalene. For the polymer (PVN), the refractive index and the glass transition temperature on the basis of DSC were measured by the aforementioned method. The measurement results are shown in Table 1.

Reference Example 4

(R4-1. Styrene Homopolymer (PS))

Into a reaction vessel equipped with a stirrer, which had been sufficiently replaced with a nitrogen gas, 395 parts of dehydrated cyclohexane, 120 parts of dehydrated styrene, and 0.57 part of n-butyl ether were charged. Under stirring at 60° C., 0.75 part of n-butyl lithium (15% n-hexanoic solution) was added to initiate polymerization. The polymerization reaction was continued for 60 minutes. The polymerization conversion rate at this point was almost 100%. Then, 0.2 part of methanol was added to terminate the reaction. A part of the obtained polymer solution was extracted and dried to obtain a homopolymer of styrene (PS). The obtained homopolymer of styrene (PS) had a molecular weight distribution (Mw/Mn) of 1.20 and a weight-average molecular weight (Mw) of 109000. For the polymer (PS), the refractive index and the glass transition temperature on the basis of DSC were measured by the aforementioned method. The measurement results are shown in Table 1.

(R4-2. Hydrogenated Product of Styrene Homopolymer (HPS))

The obtained polymer solution was transferred into a pressure resistant reaction vessel equipped with a stirrer. To the polymer solution, 1.5 parts of a silica-alumina supported nickel catalyst (product name: T-8400RL, manufactured by Clariant Catalysts K.K., nickel containing amount 33%) as a hydrogenation catalyst and 100 parts of dehydrated cyclohexane were added and mixed. The reaction vessel was replaced with a hydrogen gas in a normal temperature state, and the temperature was increased to 170° C. in a state of being pressurized at a gauge pressure of 2 MPa. When the inside temperature of the pressure resistance reaction vessel reached 170° C., the hydrogen pressure was increased to 4.5 MPa, and a hydrogenation reaction was performed for 12 hours (hydrogenation rate: 99.9%). The resulting solution after hydrogenation was dried to obtain a hydrogenated product of a homopolymer of styrene (HPS). For the hydrogenated product (HPS), the refractive index and the glass transition temperature on the basis of DSC were measured by the aforementioned method. The measurement results are shown in Table 1.

The values of the refractive index and the glass transition temperature for the polymers obtained in Reference Examples 1 to 4 are shown in Table 1. The abbreviations in Table 1 represent as follows.
PI: isoprene homopolymer (PI)
Hydrogenated PI: hydrogenated product of isoprene homopolymer (HPI)
Hydrogenated PB: hydrogenated product of butadiene homopolymer (HPB)
PVN: 2-vinylnaphthalene homopolymer (PVN)
PS: styrene homopolymer (PS)
Hydrogenated PS: hydrogenated product of styrene homopolymer (HPS)

TABLE 1

| | | Refractive index | Glass transition temperature [° C.] |
|---|---|---|---|
| Homopolymmer of polymerization unit A, HA | | | |
| | PVN | 1.67 | 150 |
| | PS | 1.59 | 100 |
| | Hydrogenated PS | 1.51 | 140 |
| Homopolymer of polymerization unit B, B' | | | |
| | PI | 1.52 | −70 |
| | Hydrogenated PI | 1.48 | −60 |
| | Hydrogenated PB | 1.51 | −50 |

Example 1

(1-1. Triblock Copolymer)
(First Stage)
Into a pressure resistant reaction vessel dried and purged with a nitrogen gas, 500 parts of toluene as a solvent and 0.03 part of n-butyl lithium as a polymerization catalyst were charged. After that, 12.1 parts of 2-vinylnaphthalene was added as the monomer (a). The mixture was reacted at 25° C. for 1 hour for performing the polymerization reaction of the first stage.
(Second Stage)
After the polymerization reaction of the first stage completed, 11.9 parts of butadiene was added as the monomer (b). The mixture was further reacted at 25° C. for 1 hour for performing the polymerization reaction of the second stage. As a result, a diblock copolymer having a block configuration of (2-vinylnaphthalene block)-(butadiene block) was obtained in the reaction mixture.

(Third Stage)
After that, 12.1 parts of 2-vinylnaphthalene as the monomer (a) was further added to the reaction mixture. The mixture was reacted at 25° C. for 1 hour for performing the polymerization reaction of the third stage. As a result, a triblock copolymer having a block configuration of (2-vinylnaphthalene block)-(butadiene block)-(2-vinylnaphthalene block) was obtained in the reaction mixture. The reaction mixture was poured into a large amount of 2-propanol to thereby cause precipitation of the triblock copolymer, which was then isolated.

The obtained triblock copolymer was dissolved in 700 parts of p-xylene to obtain a solution. To the solution, 7.6 parts of p-toluene sulfonyl hydrazide was added and reacted at a temperature of 130° C. for 8 hours. Through this reaction, hydrogen was added to a double bond of a butadiene unit. After completion of the hydrogenation, the reaction solution was poured into a large amount of 2-propanol to obtain a triblock copolymer P1 having a block configuration of (block (A))-(block (B))-(block (A)) as a lump-shape product. In the triblock copolymer P1, the block (A) was a 2-vinylnaphthalene block, and the block (B) was a hydrogenated butadiene block.

The obtained triblock copolymer P1 was analyzed by $^1$H-NMR. As a result, the weight ratio of the 2-vinylnaphthalene unit as the polymerization unit A relative to the hydrogenated butadiene unit as the polymerization unit B in the triblock copolymer was 67:33. Thus, the weight fraction of the polymerization unit A was 67%. The hydrogenation rate of the 2-vinylnaphthalene unit was 0%, and the hydrogenation rate of the butadiene unit was 99%. That is, the molar ratio of the polymerization unit HA (hydrogenated 2-vinylnaphthalene unit) relative to the polymerization unit A (2-vinylnaphthalene unit) was 0, and the molar ratio of the polymerization unit B' (B'-1 and B'-2) (butadiene unit) relative to the polymerization unit B (hydrogenated butadiene unit) was 1/99. The weight-average molecular weight of the triblock copolymer P1 measured by gel permeation chromatography (GPC) was 110000. The glass transition temperature of the triblock copolymer P1 measured by TMA was 137° C. The intrinsic birefringence value of the triblock copolymer P1 is negative.

(1-2. Pre-Stretch Film)
The triblock copolymer P1 obtained in (1-1) was used as the resin C. The resin C was pulverized by a pulverizer to obtain a powder. The obtained powder was supplied into an extruder and melted at a resin temperature of 270° C. in the extruder. The melted powder was passed through a polymer pipe and a polymer filter and extruded from a T die onto a casting drum (cooling roll) into a sheet shape. The extruded product was cooled to obtain a pre-stretch film 1 with a thickness of 90 μm. The cooling roll temperature was set to 138° C. The screw rotation speed of the extruder was set to 20 to 40 rpm. The produced pre-stretch film 1 was wound up into a roll shape for collection.

For the obtained pre-stretch film 1, the phase structure was observed by irradiation of the cross section with X-ray by the small-angle X-ray scattering method under the aforementioned conditions. As a result, a cylinder structure was observed. Furthermore, a cut piece of a cross section parallel to the thickness direction was prepared and observed by TEM. As a result, a cylinder-shape phase separation structure was confirmed. The distance between phases was 40 nm.

The Rth/d of the obtained pre-stretch film 1 was measured. The result was Rth/d=5.5×10$^{-3}$.

(1-3. Phase Difference Film (λ/4 Plate))

The pre-stretch film 1 obtained in the aforementioned (1-2) was cut to obtain an 80 mm×80 mm rectangular film. The rectangular film was subjected to free width uniaxial stretching. The stretching was performed using a batch-type stretching device manufactured by Toyo Seiki Seisaku-sho, Ltd. The stretching conditions were stretching temperature of 147° C., stretching ratio of 2.0 times, and stretching speed of 33%/min. As a result, a phase difference film 1Q with a thickness of 65 μm was obtained. Using the obtained phase difference film 1Q that functions as a λ/4 plate, the viewing angle properties and the heat resistance were evaluated by the aforementioned methods.

Example 2

(2-1. Triblock Copolymer)

A triblock copolymer P2 was obtained as a lump-shape product by the same manner as that of Example 1 (1-1. Triblock copolymer) except for the following matters.

In the reaction of (first stage), 10.3 parts of 2-vinylnaphthalene was added as the monomer (a).

The amount of n-butyllithium was changed from 0.03 part to 0.04 part.

In the reaction of (second stage), 15.4 parts of butadiene was added as the monomer (b).

In the reaction of (third stage), 10.3 parts of 2-vinylnaphthalene was added as the monomer (a).

The triblock copolymer P2 has a block configuration of (block (A))-(block (B))-(block (A)). In the triblock copolymer P2, the block (A) was a 2-vinylnaphthalene block and the block (B) was a hydrogenated butadiene block.

The obtained triblock copolymer P2 was analyzed by $^1$H-NMR. As a result, the weight ratio of the 2-vinylnaphthalene unit as the polymerization unit A relative to the hydrogenated butadiene unit as the polymerization unit B in the triblock copolymer was 57:43, and thus, the weight fraction of the polymerization unit A was 57%. The hydrogenation rate of the 2-vinylnaphthalene unit was 0%, and the hydrogenation rate of the butadiene unit was 99%. That is, the molar ratio of the polymerization unit HA (hydrogenated 2-vinylnaphthalene unit) relative to the polymerization unit A (2-vinylnaphthalene unit) was 0, and the molar ratio of the polymerization unit B' (B'-1 and B'-2) (butadiene unit) relative to the polymerization unit B (hydrogenated butadiene unit) was 1/99. The weight-average molecular weight of the triblock copolymer P2 measured by GPC was 85000. The glass transition temperature of the triblock copolymer P2 measured by TMA was 125° C. The intrinsic birefringence value of the triblock copolymer P2 is negative.

(2-2. Pre-Stretch Film)

A pre-stretch film 2 was obtained by the same manner as that of Example 1 (1-2. Pre-stretch film) except for the following matter.

The triblock copolymer P2 was used as the resin C.

For the obtained pre-stretch film 2, the phase structure was observed by irradiation of the cross section with X-ray by the small-angle X-ray scattering method under the aforementioned conditions. As a result, a lamellar structure was observed. The distance between phases was 50 nm. Furthermore, a cut piece of a cross section parallel to the thickness direction was prepared and observed by TEM. As a result, a lamella-shape phase separation structure was confirmed.

The Rth/d of the obtained pre-stretch film 2 was measured. The result was Rth/d=$6.5\times10^{-3}$.

(2-3. Phase Difference Film (λ/4 Plate))

A phase difference film 2Q with a thickness of 65 μm was obtained by the same manner as that of Example 1 (1-3. Phase difference film (λ/4 plate)) except for the following matters.

The pre-stretch film 2 was used instead of the pre-stretch film 1.

The stretching temperature was changed to 140° C.

Using the obtained phase difference film 2Q, the viewing angle properties and the heat resistance were evaluated by the aforementioned methods.

Example 3

(3-1. Triblock Copolymer)

A triblock copolymer P3 was obtained as a lump-shape product by the same manner as that of Example 1 (1-1. Triblock copolymer) except for the following matters.

In the reaction of (first stage), 12.1 parts of 2-vinylnaphthalene was added as the monomer (a).

In the reaction of (second stage), 11.9 parts of isoprene was added instead of 11.9 parts of butadiene as the monomer (b).

In the reaction of (third stage), 12.1 parts of 2-vinylnaphthalene was added as the monomer (a).

The triblock copolymer P3 has a block configuration of (block (A))-(block (B))-(block (A)). In the triblock copolymer P3, the block (A) was a 2-vinylnaphthalene block and the block (B) was a hydrogenated isoprene block.

The obtained triblock copolymer P3 was analyzed by $^1$H-NMR. As a result, the weight ratio of the 2-vinylnaphthalene unit as the polymerization unit A relative to the hydrogenated isoprene unit as the polymerization unit B in the triblock copolymer was 67:33, and thus, the weight fraction of the polymerization unit A was 67%. The hydrogenation rate of the 2-vinylnaphthalene unit was 0%, and the hydrogenation rate of the isoprene unit was 99%. That is, the molar ratio of the polymerization unit HA (hydrogenated 2-vinylnaphthalene unit) relative to the polymerization unit A (2-vinylnaphthalene unit) was 0, and the molar ratio of the polymerization unit B' (B'-1 and B'-2) (isoprene unit) relative to the polymerization unit B (hydrogenated isoprene unit) was 1/99. The weight-average molecular weight of the triblock copolymer P3 measured by GPC was 100000. The glass transition temperature of the triblock copolymer P3 measured by TMA was 138° C. The intrinsic birefringence value of the triblock copolymer P3 is negative.

(3-2. Pre-Stretch Film)

A pre-stretch film 3 was produced by the same manner as that of Example 1 (1-2. Pre-stretch film) except for the following matter.

The triblock copolymer P3 was used as the resin C instead of the triblock copolymer P1.

For the obtained pre-stretch film 3, the phase structure was observed by irradiation of the cross section with X-ray by the small-angle X-ray scattering method under the aforementioned conditions. As a result, a cylinder structure was observed. The distance between phases was 40 nm. Furthermore, a cut piece of a cross section parallel to the thickness direction was prepared and observed by TEM. As a result, a cylinder-shape phase separation structure was confirmed.

The Rth/d of the obtained pre-stretch film 3 was measured. The result was Rth/d=$4.0\times10^{-3}$.

(3-3. Phase Difference Film (λ/4 Plate))

A phase difference film 3Q with a thickness of 60 μm was obtained by the same manner as that of Example 1 (1-3. Phase difference film (λ/4 plate)) except for the following matters.

The pre-stretch film 3 was used instead of the pre-stretch film 1.

The stretching temperature was changed to 148° C.

Using the obtained phase difference film 3Q, the viewing angle properties and the heat resistance were evaluated by the aforementioned methods.

Example 4

(4-1. Triblock Copolymer)

The triblock copolymer P3 produced in Example 3 (3-1. Triblock copolymer) was prepared.

(4-2. Pre-Stretch Film)

A pre-stretch film 4 was produced by the same manner as that of Example 1 (1-2. Pre-stretch film) except for the following matters.

The triblock copolymer P4 was used as the resin C instead of the triblock copolymer P1.

The temperature of the cooling roll was set at 110° C.

The screw rotation speed of the extruder was set at 150 to 200 rpm.

For the obtained pre-stretch film 4, the phase structure was observed by irradiation of the cross section with X-ray by the small-angle X-ray scattering method under the aforementioned conditions. As a result, a cylinder structure was observed. The distance between phases was 35 nm. Furthermore, a cut piece of a cross section parallel to the thickness direction was prepared and observed by TEM. As a result, a cylinder-shape phase separation structure was confirmed.

The Rth/d of the obtained pre-stretch film 4 was measured. The result was $Rth/d=3.0\times10^{-3}$.

(4-3. Phase Difference Film (λ/4 Plate))

A phase difference film 4Q with a thickness of 70 μm was obtained by the same manner as that of Example 1 (1-3. Phase difference film (λ/4 plate)) except for the following matters.

The pre-stretch film 4 was used instead of the pre-stretch film 1.

The stretching temperature was changed to 148° C.

Using the obtained phase difference film 4Q, the viewing angle properties and the heat resistance were evaluated by the aforementioned methods.

Comparative Example 1

(C1-1. Triblock Copolymer)

A triblock copolymer CP1 was obtained as a lump-shape product by the same manner as that of Example 1 (1-1. Triblock copolymer) except for the following matters.

In the reaction of (first stage), 13.0 parts of 2-vinylnaphthalene was added as the monomer (a).

In the reaction of (second stage), 10.1 parts of isoprene was added instead of 11.9 parts of butadiene as the monomer (b).

In the reaction of (third stage), 13.0 parts of 2-vinylnaphthalene was added as the monomer (a).

The triblock copolymer CP1 has a block configuration of (block (A))-(block (B))-(block (A)). In the triblock copolymer CP1, the block (A) was a 2-vinylnaphthalene block and the block (B) was a hydrogenated isoprene block.

The obtained triblock copolymer CP1 was analyzed by $^1$H-NMR. As a result, the weight ratio of the 2-vinylnaphthalene unit as the polymerization unit A relative to the hydrogenated isoprene unit as the polymerization unit B in the triblock copolymer was 72:28, and thus, the weight fraction of the polymerization unit A was 72%. The hydrogenation rate of the 2-vinylnaphthalene unit was 0%, and the hydrogenation rate of the isoprene unit was 99%. That is, the molar ratio of the polymerization unit HA (hydrogenated 2-vinylnaphthalene unit) relative to the polymerization unit A (2-vinylnaphthalene unit) was 0, and the molar ratio of the polymerization unit B' (B'-1 and B'-2) (isoprene unit) relative to the polymerization unit B (hydrogenated isoprene unit) was 1/99. The weight-average molecular weight of the triblock copolymer CP1 measured by GPC was 120000. The glass transition temperature of the triblock copolymer CP1 measured by TMA was 140° C. The intrinsic birefringence value of the triblock copolymer CP1 is negative.

(C1-2. Pre-Stretch Film)

A pre-stretch film C1 was obtained by the same manner as that of Example 1 (1-2. Pre-stretch film) except for the following matters.

The triblock copolymer CP1 was used as the resin C.

The temperature of the cooling roll was set at 110° C.

The screw rotation speed of the extruder was set at 150 to 200 rpm.

For the obtained pre-stretch film C1, the phase structure was observed by irradiation of the cross section with X-ray by the small-angle X-ray scattering method under the aforementioned conditions. As a result, the obtained scattering pattern was unclear, and fitting to a theoretical curve was impossible. Furthermore, a cut piece of a cross section parallel to the thickness direction was prepared and observed by TEM. As a result, a cylinder structure with random size and dimensions was observed.

The Rth/d of the obtained pre-stretch film C1 was measured. The result was $Rth/d=0.4\times10^{-3}$.

(C1-3. Phase Difference Film (λ/4 Plate))

A phase difference film C1Q with a thickness of 65 μm was obtained by the same manner as that of Example 1 (1-3. Phase difference film (λ/4 plate)) except for the following matters.

The pre-stretch film C1 was used instead of the pre-stretch film 1.

The stretching temperature was changed to 150° C.

Using the obtained phase difference film C1Q, the viewing angle properties and the heat resistance were evaluated by the aforementioned methods.

Comparative Example 2

(C2-1. Triblock Copolymer)

A triblock copolymer CP2 was obtained as a lump-shape product by the same manner as that of Example 1 (1-1. Triblock copolymer) except for the following matters.

In the reaction of (first stage), 14.4 parts of 2-vinylnaphthalene was added as the monomer (a).

The amount of n-butyllithium was changed from 0.03 part to 0.05 part.

In the reaction of (second stage), 7.2 parts of isoprene was added instead of 11.9 parts of butadiene as the monomer (b).

In the reaction of (third stage), 14.4 parts of 2-vinylnaphthalene was added as the monomer (a).

The triblock copolymer CP2 has a block configuration of (block (A))-(block (B))-(block (A)). In the triblock copolymer CP2, the block (A) was a 2-vinylnaphthalene block and the block (B) was a hydrogenated isoprene block.

The obtained triblock copolymer CP2 was analyzed by $^1$H-NMR. As a result, the weight ratio of the 2-vinylnaphthalene unit as the polymerization unit A relative to the hydrogenated isoprene unit as the polymerization unit B in the triblock copolymer was 80:20, and thus, the weight fraction of the polymerization unit A was 80%. The hydrogenation rate of the 2-vinylnaphthalene unit was 0%, and the hydrogenation rate of the isoprene unit was 99%. That is, the molar ratio of the polymerization unit HA (hydrogenated 2-vinylnaphthalene unit) relative to the polymerization unit A (2-vinylnaphthalene unit) was 0, and the molar ratio of the polymerization unit B' (B'-1 and B'-2) (isoprene unit) relative to the polymerization unit B (hydrogenated isoprene unit) was 1/99. The weight-average molecular weight of the triblock copolymer CP2 measured by GPC was 70000. The glass transition temperature of the triblock copolymer CP2 measured by TMA was 143° C. The intrinsic birefringence value of the triblock copolymer CP2 is negative.

(C2-2. Pre-Stretch Film)

A pre-stretch film C2 was obtained by the same manner as that of Example 1 (1-2. Pre-stretch film) except for the following matter.

The triblock copolymer CP2 was used as the resin C instead of the triblock copolymer P1.

For the obtained pre-stretch film C2, the phase structure was observed by irradiation of the cross section with X-ray by the small-angle X-ray scattering method under the aforementioned conditions. As a result, the obtained scattering pattern was unclear, and fitting to a theoretical curve was impossible. Furthermore, a cut piece of a cross section parallel to the thickness direction was prepared and observed by TEM. As a result, a cylinder structure with random size and dimensions was observed.

The Rth/d of the obtained pre-stretch film C2 was measured. The result was Rth/d=$0.2 \times 10^{-3}$.

(C2-3. Phase Difference Film (λ/4 Plate))

A phase difference film C2Q with a thickness of 65 μm was obtained by the same manner as that of Example 1 (1-3. Phase difference film (λ/4 plate)) except for the following matters.

The pre-stretch film C2 was used instead of the pre-stretch film 1.

The stretching temperature was changed to 153° C.

Using the obtained phase difference film C2Q, the viewing angle properties and the heat resistance were evaluated by the aforementioned methods.

Comparative Example 3

(C3-1. Triblock Copolymer)
(First Stage)

Into a reaction vessel equipped with a stirrer, which had been sufficiently replaced with a nitrogen gas, 395 parts of dehydrated cyclohexane, 37.1 parts of dehydrated styrene, and 0.65 part of n-butyl ether were charged. Under stirring at 60° C., 0.87 part of n-butyl lithium (15% n-hexane solution) was added to initiate polymerization. The polymerization reaction was continued for 60 minutes.

(Second Stage)

Subsequently, 55.9 parts of dehydrated isoprene was added, and the mixture was continuously stirred for 40 minutes.

(Third Stage)

After that, 37.1 parts of dehydrated styrene was added under stirring at 60° C. and reacted for 60 minutes. The polymerization conversion rate at this point was almost 100%. Then, 0.2 part of methanol was added to terminate the reaction. As a result, a triblock copolymer having a block configuration of (styrene block)-(isoprene block)-(styrene block) was obtained in the reaction mixture. The reaction mixture was poured into a large amount of 2-propanol to thereby cause precipitation of the triblock copolymer, which was then isolated.

The obtained triblock copolymer was dissolved in 700 parts of p-xylene to obtain a solution. To the solution, 7.6 parts of p-toluene sulfonyl hydrazide was added and reacted at a temperature of 130° C. for 8 hours. Through this reaction, hydrogen was added to the double bond of an isoprene unit. After completion of the hydrogenation, the reaction solution was poured into a large amount of 2-propanol to obtain an (A)-(B)-(A) triblock copolymer CP3 having a block configuration of (styrene block)-(hydrogenated isoprene block)-(styrene block) as a lump-shape product.

The obtained triblock copolymer CP3 was analyzed by $^1$H-NMR. As a result, the weight ratio of the styrene unit as the polymerization unit A relative to the hydrogenated isoprene unit as the polymerization unit B in the triblock copolymer was 57:43, and thus, the weight fraction of the polymerization unit A was 57%. The hydrogenation rate of the styrene unit was 0%, and the hydrogenation rate of the isoprene unit was 99%. The weight-average molecular weight of the triblock copolymer CP3 measured by GPC was 80000. The glass transition temperature of the triblock copolymer CP3 measured by TMA was 80° C. The intrinsic birefringence value of the triblock copolymer CP3 is positive.

(C3-2. Pre-Stretch Film)

A pre-stretch film C3 was obtained by the same manner as that of Example 1 (1-2. Pre-stretch film) except for the following matter.

The triblock copolymer CP3 was used as the resin C instead of the triblock copolymer P1.

For the obtained pre-stretch film C3, the phase structure was observed by irradiation of the cross section with X-ray by the small-angle X-ray scattering method under the aforementioned conditions. As a result, the obtained scattering pattern was unclear, and fitting to a theoretical curve was impossible. Furthermore, a cut piece of a cross section parallel to the thickness direction was prepared and observed by TEM. As a result, a lamellar structure was observed.

The Rth/d of the obtained pre-stretch film C3 was measured. The result was Rth/d=$0.3 \times 10^{-3}$.

(C3-3. Phase Difference Film (λ/4 Plate))

A phase difference film C3Q with a thickness of 65 μm was obtained by the same manner as that of Example 1 (1-3. Phase difference film (λ/4 plate)) except for the following matters.

The pre-stretch film C3 was used instead of the pre-stretch film 1.

The stretching temperature was changed to 90° C.

Using the obtained phase difference film C3Q, the viewing angle properties and the heat resistance were evaluated by the aforementioned methods.

Comparative Example 4

(C4-1. Triblock Copolymer)
(First Stage)

Into a reaction vessel equipped with a stirrer, which had been sufficiently replaced with a nitrogen gas, 395 parts of dehydrated cyclohexane, 43.6 parts of dehydrated styrene, and 0.65 part of n-butyl ether were charged. Under stirring at 60° C., 0.87 part of n-butyl lithium (15% n-hexane solution) was added to initiate polymerization. The polymerization reaction was continued for 60 minutes.

(Second Stage)

Subsequently, 42.9 parts of dehydrated isoprene was added, and the mixture was continuously stirred for 40 minutes.

(Third Stage)

After that, 43.6 parts of dehydrated styrene was added under stirring at 60° C. and reacted for 60 minutes. The polymerization conversion rate at this point was almost 100%. Then, 0.2 part of methanol was added to terminate the reaction. As a result, a triblock copolymer CP4 having a block configuration of (styrene block)-(isoprene block)-(styrene block) was obtained in the reaction mixture.

The obtained triblock copolymer CP4 was analyzed by $^1$H-NMR. As a result, the weight ratio of the styrene unit as the polymerization unit A relative to the isoprene unit as the polymerization unit B' in the triblock copolymer was 67:33. Thus, the weight fraction of the polymerization unit A was 67%. The weight-average molecular weight of the triblock copolymer CP4 measured by GPC was 90000. The glass transition temperature of the triblock copolymer CP4 measured by TMA was 87° C. The intrinsic birefringence value of the triblock copolymer CP4 is positive.

(C4-2. Pre-Stretch Film)

A pre-stretch film C4 was produced by the same manner as that of Example 1 (1-2. Pre-stretch film) except for the following matter.

The triblock copolymer CP4 was used as the resin C instead of the triblock copolymer P1.

For the obtained pre-stretch film C4, the phase structure was observed by irradiation of the cross section with X-ray by the small-angle X-ray scattering method under the aforementioned conditions. As a result, the obtained scattering pattern was unclear, and fitting to a theoretical curve was impossible. Furthermore, a cut piece of a cross section parallel to the thickness direction was prepared and observed by TEM. As a result, a lamellar structure was observed.

The Rth/d of the obtained pre-stretch film C4 was measured. The result was Rth/d=0.2×10$^{-3}$.

(C4-3. Phase Difference Film (λ/4 Plate))

A phase difference film C4Q with a thickness of 70 μm was obtained by the same manner as that of Example 1 (1-3. Phase difference film (λ/4 plate)) except for the following matters.

The pre-stretch film C4 was used instead of the pre-stretch film 1.

The stretching temperature was changed to 140° C.

Using the obtained phase difference film C4Q, the viewing angle properties and the heat resistance were evaluated by the aforementioned methods.

The results of Examples and Comparative Examples are shown in the following tables.

Meanings of the abbreviations in the following tables are as follows.

VN: 2-vinylnaphthalene block
HB: hydrogenated butadiene block
HIp: hydrogenated isoprene block
St: styrene block
Weight fraction (A): weight fraction (%) of 2-vinylnaphthalene unit or styrene unit
n(A): refractive index of polymer (A)
Tg(A): glass transition temperature (° C.) of polymer (A)
n(B): refractive index of polymer (B)
Tg(B): glass transition temperature (° C.) of polymer (B)
PI: isoprene homopolymer (PI)
HPI: hydrogenated product of isoprene homopolymer (HPI)
HPB: hydrogenated product of butadiene homopolymer (HPB)
PVN: 2-vinylnaphthalene homopolymer (PVN)
PS: styrene homopolymer (PS)

Regarding the items of extrusion speed, "slow" means that the screw speed of the extruder is 20 to 40 rpm, and "fast" means that the screw speed of the extruder is 150 to 200 rpm.

TABLE 2

|  | Ex. 1 | Ex. 2 | Ex. 3 | Ex. 4 |
|---|---|---|---|---|
| Resin | VN-HB-VN | VN-HB-VN | VN-HIp-VN | VN-HIp-VN |
| Structural birefringence | Yes | Yes | Yes | Yes |
| Weight fraction (A) (%) | 67 | 57 | 67 | 67 |
| Molding temperature (resin temperature) (° C.) | 270 | 270 | 270 | 270 |
| Cooling roll temperature (° C.) | 138 | 138 | 138 | 110 |
| Extrusion speed | Slow | Slow | Slow | Fast |
| Polymer (A) | PVN | PVN | PVN | PVN |
| n(A) | 1.67 | 1.67 | 1.67 | 1.67 |
| Tg(A)(° C.) | 150 | 150 | 150 | 150 |
| Polymer (B) | HPB | HPB | HPI | HPI |
| n(B) | 1.51 | 1.51 | 1.48 | 1.48 |
| Tg(B)(° C.) | −50 | −50 | −60 | −60 |
| Refractive index difference \|n(A)-n(B)\| | 0.16 | 0.16 | 0.19 | 0.19 |
| Tg difference \|Tg(A)-Tg(B)\| (° C.) | 200 | 200 | 210 | 210 |
| Viewing angle properties | Excellent | Excellent | Excellent | Good |
| Heat resistance | Good | Good | Good | Good |

TABLE 3

|  | Comp. Ex. 1 | Comp. Ex. 2 | Comp. Ex. 3 | Comp. Ex. 4 |
|---|---|---|---|---|
| Resin | VN-HIp-VN | VN-HIp-VN | St-HIp-St | St-Ip-St |
| Structural birefringence | No | No | No | No |
| Weight fraction (A) (%) | 72 | 80 | 57 | 67 |
| Molding temperature (resin temperature) (° C.) | 270 | 270 | 270 | 270 |
| Cooling roll temperature (° C.) | 110 | 138 | 138 | 138 |
| Extrusion speed | Fast | Slow | Slow | Slow |
| Polymer (A) | PVN | PVN | PS | PS |
| n(A) | 1.67 | 1.67 | 1.59 | 1.59 |
| Tg(A)(° C.) | 150 | 150 | 100 | 100 |
| Polymer (B) | HPI | HPI | HPI | PI |
| n(B) | 1.48 | 1.48 | 1.48 | 1.52 |
| Tg(B)(° C.) | −60 | −60 | −60 | −70 |

TABLE 3-continued

| | Comp. Ex. 1 | Comp. Ex. 2 | Comp. Ex. 3 | Comp. Ex. 4 |
|---|---|---|---|---|
| Refractive index difference \|n(A)-n(B)\| | 0.19 | 0.19 | 0.11 | 0.07 |
| Tg difference \|Tg(A)-Tg(B)\| (° C.) | 210 | 210 | 160 | 170 |
| Viewing angle properties | Poor | Poor | Poor | Poor |
| Heat resistance | Good | Good | Poor | Poor |

From the aforementioned results, the fallowing matters are found.

The phase difference films according ta Comparative Examples 1 to 4, which have a phase separation structure but do not express structural birefringence, have poor viewing angle properties.

The phase difference films according ta Comparative Examples 3 and 4, in which the absolute value of the glass transition temperature difference |Tg(A)–Tg(B)| (° C.) is lower than 180° C., have poor heat resistance.

The phase difference films according to Examples, in which a phase separation structure is included, structural birefringence is expressed, and the absolute value of the difference in refractive index |n(A)–n(B)| is 0.12 or more, have good heat resistance and viewing angle properties and strike a balance between excellent heat resistance and excellent viewing angle properties.

The phase difference films according to Examples, in which the absolute value of the difference in glass transition temperature |Tg(A)–Tg(B)| (° C.) is 180° C. or higher, have good heat resistance and viewing angle properties and strike a balance between excellent heat resistance and excellent viewing angle properties.

The aforementioned results demonstrate that a phase difference film expressing excellent improvement effect in both heat resistance and viewing angle properties can be produced at low cost from the optical film of the present invention.

The invention claimed is:

1. An optical film formed of a resin C including a copolymer P containing a polymerization unit A and a polymerization unit B, wherein
    the optical film includes a phase separation structure that expresses structural birefringence,
    the phase separation structure includes a phase (A) containing as a main component the polymerization unit A and a phase (B) containing as a main component the polymerization unit B,
    an absolute value |n(A)–n(B)| of a difference between a refractive index n (A) of a polymer (A) formed of the polymerization unit A and a refractive index n(B) of a polymer (B) formed of the polymerization unit B is 0.12 or more, and
    a value of Rth/d is $0.5 \times 10^{-3}$ or more wherein the Rth represents a thickness-direction retardation of the optical film and the d represents a thickness of the optical film.

2. The optical film according to claim 1, wherein an absolute value |Tg(A)–Tg(B)| of a difference between a glass transition temperature Tg(A) (° C.) of the polymer (A) and a glass transition temperature Tg(B) (° C.) of the polymer (B) is 180° C. or higher.

3. The optical film according to claim 1, wherein the glass transition temperature Tg(A) (° C.) is 120°° C. or higher.

4. The optical film according to claim 1, wherein the phase separation structure has a configuration of any of lamella, cylinder, or spheroid.

5. The optical film according to claim 1, wherein a distance between phases in the phase separation structure is 200 nm or less.

6. The optical film according to claim 1, wherein the copolymer P is a block copolymer having a block (A) containing as a main component the polymerization unit A and a block (B) containing as a main component the polymerization unit B.

7. The optical film according to claim 1, wherein the polymerization unit A is a unit represented by the following general formula (A):

(A)

in the formula, $R^C$ is a group selected from the group consisting of a phenyl group, a biphenylyl group, a naphthyl group, an anthracenyl group, a phenanthrenyl group, a naphthacenyl group, a pentacenyl group, and a terphenylyl group, and
$R^1$ to $R^3$ are each independently one selected from the group consisting of a hydrogen atom and an alkyl group of 1 to 12 carbon atoms.

8. The optical film according to claim 7, wherein a molar ratio of a polymerization unit HA, which is a hydrogenation product of the polymerization unit A, relative to the polymerization unit A in the copolymer P is 0/100 or more and 10/90 or less.

9. The optical film according to claim 1, wherein the polymerization unit B is a unit represented by the general formula (B-1) or a unit represented by the general formula (B-2):

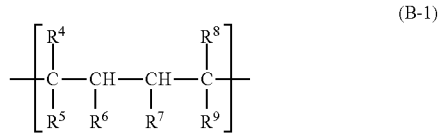

(B-1)

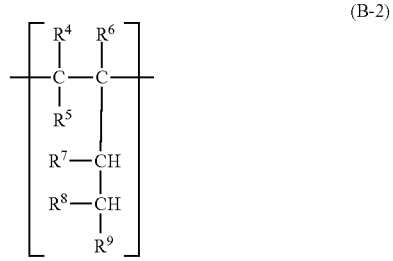

(B-2)

in the formula, $R^4$ to $R^9$ are each independently one selected from the group consisting of a hydrogen atom and an alkyl group of 1 to 6 carbon atoms.

10. The optical film according to claim 9, wherein a total molar ratio of a unit represented by the following general formula (B'-1) and a unit represented by the following general formula (B'-2) relative to the polymerization unit B in the copolymer P is 0/100 or more and 10/90 or less:

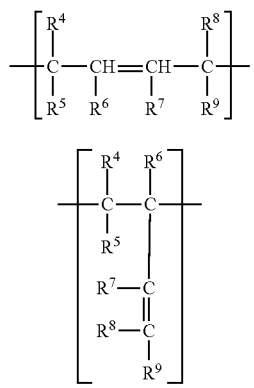

in the formula, $R^4$ to $R^9$ are each independently one selected from the group consisting of a hydrogen atom and an alkyl groupo of 1 to 6 carbon atoms.

11. The optical film according to claim 1, wherein
the polymerization unit A is a vinylnaphthalene unit, a vinylnaphthalene derivative unit, a styrene unit, or a styrene derivative unit, and
the polymerization unit B is a unit that is a hydrogenation product of an isoprene unit, a unit that is a hydrogenation product of a butadiene unit, a unit that is a hydrogenation product of a 1,3-pentadiene unit, a unit that is a hydrogenation product of a 2,3-dimethyl-1,3-butadiene unit, a unit that is a hydrogenation product of a 1,3-hexadiene unit, a unit that is a hydrogenation product of a 2-methyl-1,3-pentadiene unit, a unit that is a hydrogenation product of a 3-methyl-1,3-pentadiene unit, or a unit that is a hydrogenation product of a 2,4-dimethyl-1,3-pentadiene unit.

12. The optical film according to claim 1, wherein
the copolymer P includes a triblock copolymer P', and
the triblock copolymer P' is a triblock copolymer of (A)-(B)-(A) having a block (A) containing as a main component the polymerization unit A and a block (B) containing as a main component the polymerization unit B.

13. The optical film according to claim 1, wherein the copolymer P has a negative intrinsic birefringence value.

14. The optical film according to claim 1, wherein the polymerization unit A has a negative intrinsic birefringence value, and the polymerization unit B has a positive intrinsic birefringence value.

15. The optical film according to claim 1, wherein a weight fraction of the polymerization unit A in the copolymer P is 50% by weight or more and less than 70% by weight.

16. A method for producing the optical film according to claim 1, comprising the steps of:
heating the resin C at 150° C. or higher to form a single-layer film of the resin C; and
causing phase-separation of the resin C in the film.

17. A method for producing a phase difference film comprising the step of stretching the optical film according to claim 1 to obtain a phase difference film.

18. The method for producing a phase difference film according to claim 17, wherein the optical film is produced by the method for producing the optical film including the steps of:
heating the resin C at 150° C. or higher to form a single-layer film of the resin C; and
causing phase-separation of the resin C in the film.

19. The optical film according to claim 12, wherein
the polymerization unit A is a vinylnaphthalene unit or a vinylnaphthalene derivative unit, and
the polymerization unit B is a unit that is a hydrogenation product of an isoprene unit, a unit that is a hydrogenation product of a butadiene unit, a unit that is a hydrogenation product of a 1,3-pentadiene unit, a unit that is a hydrogenation product of a 2,3-dimethyl-1,3-butadiene unit, a unit that is a hydrogenation product of a 1,3-hexadiene unit, a unit that is a hydrogenation product of a 2-methyl-1,3-pentadiene unit, a unit that is a hydrogenation product of a 3-methyl-1,3-pentadiene unit, or a unit that is a hydrogenation product of a 2,4-dimethyl-1,3-pentadiene unit.

20. The method for producing the optical film according to claim 16, wherein the step of forming the film includes melt-extruding a single layer of the resin C.

* * * * *